May 2, 1939. R. A. BELL 2,156,272
COUPLING DEVICE
Filed Feb. 5, 1937
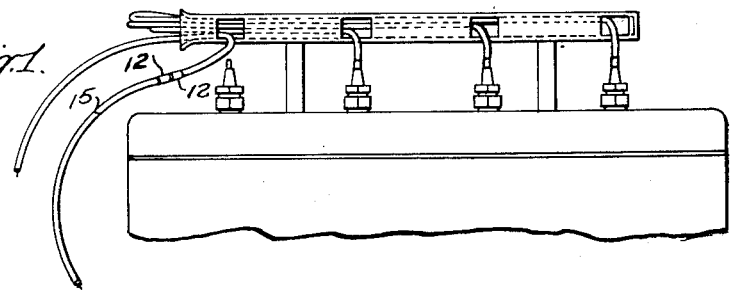
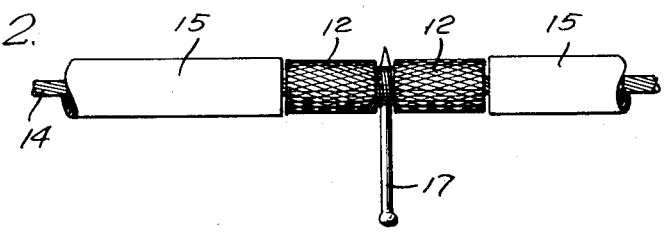
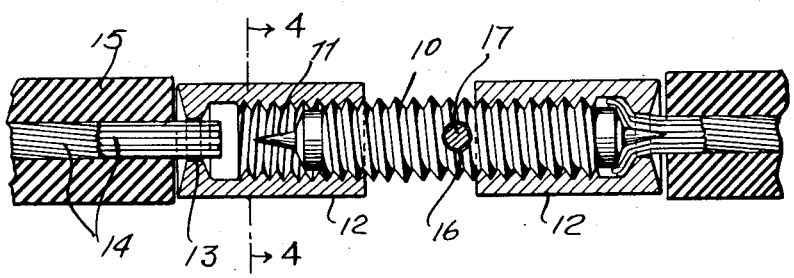
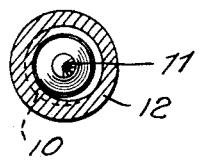
INVENTOR
ROBERT A. BELL
ATTORNEYS Patented May 2, 1939

2,156,272

UNITED STATES PATENT OFFICE 2,156,272

COUPLING DEVICE

Robert A. Bell, Montclair, N. J., assignor to The Rajah Company, Bloomfield, N. J., a corporation of New Jersey Application February 5, 1937, Serial No. 124,819

1 Claim. (Cl. 174—94)

This invention relates to a coupling device for connecting electrical cables and the like.

It is common practice in many cases to protect insulated electrical conductors against mechanical injury by conduits through which they pass for substantial distances. The flexible insulated conductors are difficult to insert through such conduits both because of their flexibility, which makes it difficult to push them from one end without jamming them into the tube, and because their natural curvature, resulting from the fact that they are commonly stored and shipped in rolls, tends to press their ends against the sides of the conduit thus giving a relatively high friction which is increased by any end pressure exerted thereon to push the cable through the conduit. When, as is frequently the case, a number of wires pass through a conduit emerging at different positions along the length of the conduit the difficulty is greatly increased because of the tendency of the wire or cable which is being inserted to become entangled with the other wires in the conduit; and even when it is possible to push the wire through the tube it may be impossible to bring it out from among the other wires at the opening through which it should pass.

It is one object of my invention, therefore, to facilitate the replacement of wires, cables, and other flexible conductors in conduits of various kinds.

Another object of the invention is to provide a coupling device for forming a tight and secure connection between the ends of wires.

In the accompanying drawing I have shown a preferred embodiment of my invention and one example of its use. These and the accompanying description are given by way of example and for purposes of illustrating the invention and instructing others in the best way of utilizing the invention in actual practice. These are not intended to be exhaustive or limiting of the invention, but rather to enable others so fully to understand the principles of the invention and of its embodiment that they may vary and modify it in numerous ways and with various forms, each as may be best suited to the particular requirements demanded by a given use.

In the drawing:

Fig. 1 is a fragmentary view in side elevation of an automobile engine showing a conduit carrying high tension conductors of flexible insulated cables and a coupling embodying my invention in use for replacing one of the cables;

Fig. 2 is a view in side elevation on an enlarged scale of a coupling embodying my invention engaging the ends of two pieces of cable;

Fig. 3 is a view in axial section on a still larger scale of a coupling similar to that shown in Fig. 2;

Fig. 4 is a cross-sectional view taken on line 4—4 of Fig. 3.

The coupling shown in Figs. 1 to 4 consists of a double ended threaded male member 10 having tapered spikes 11 at its ends a pair of female members 12 threaded for engagement with the male member 10 and each having an opening 13 in its end of approximately the size of the stranded conductors 14 of the insulated cable 15. A hole 16 is drilled through the center of the male member 10 and in this hole is received a brad 17 which serves as a convenient tool for holding or turning the member 10 to tighten the members 10 and 12 onto the wire 14.

In the use of this device for replacing a cable, e. g., as shown in Fig. 1, the terminal is removed from the old cable, e. g., by cutting off the end section. The insulation is then stripped for a short distance along the cable to expose the central conductor 14 and this is inserted through the opening 13 of one of the female members 12. The male member 10 is then screwed into this member 12 and the spike 11 passing into the center of the stranded conductor clamps it against the sides of the opening 13 and between the ends of the member 10 and the inside of the member 12. The final tightening may be accomplished by inserting the brad 17 through the opening 16 and thus gaining additional leverage upon the male screw member.

The end of the replacement cable is then stripped in the same way and in the same way is inserted through the other member 12 and clamped therein by means of the male member 10 as already described.

The outer diameter of the members 12 being not substantially greater than the outside diameter of the insulated cable 15 the two cables thus joined together may be pulled as one through the conduit or any other member and thus the old worn out cable may serve as a leader to guide and pull the new cable into place. When the new cable is in place the coupling may be removed by loosening the members 12 from the member 10 and pulling out the wires. The end of the new cable when removed from the coupling will be in condition for connection to a suitable terminal without any further stripping or preparation of the wire.

Although I have shown in Fig. 1 and described above one particular use of my invention it should be understood that this is only one example and obviously the device may be used for many other purposes.

What I claim is:

A device for mechanically connecting the ends of automobile insulated ignition cables of the type having a stranded conductor covered by a thick insulating sheath in such manner as to form a single tensile member composed of two cables and said connecting device, the said tensile member being adapted to pass through openings designed for said cable, said device comprising two internally threaded sleeves of an external diameter not greater than the external diameter of said insulated cable, and an externally threaded rod adapted to be threaded into said sleeves, each of said sleeves being formed with the internal threads thereof beginning at one end of said sleeve and being terminated a substantial distance from the other end thereof, an enlarged chamber portion between said threads and said other end and an inwardly extending flange substantially at said other end to define an annular shoulder on the side of said chamber opposite said threads whereby the chamber communicates with the exterior of said sleeve by way of a constricted circular opening, said rod being formed with threads corresponding to those in the said sleeves along its entire length except for a short portion of each end thereof, each of said ends terminating in a sharp conical spike concentric with the axis of said rod and an annular shoulder intermediate said threads and said spike, said spike being of a length such that it will project into said constricted circular opening when said rod is screwed into said sleeve, said rod having a hole cut through the middle thereof at right angles to the axis of said rod to facilitate tightening of the device.

ROBERT A. BELL.